US005316328A

United States Patent [19]

Bussinger

[11] Patent Number: 5,316,328

[45] Date of Patent: May 31, 1994

[54] BUMPER MOUNTED ANTI-TIP STABILIZERS FOR CHAIR-MOUNTING VEHICLES UTILIZED BY PHYSICALLY DISADVANTAGED PERSONS AND OTHERS DESIRING MOBILITY ASSISTANCE, AND METHODS OF STABILIZING SUCH VEHICLES

[75] Inventor: Allen L. Bussinger, Saginaw, Mich.

[73] Assignee: Amigo Mobility International, Inc., Bridgeport, Mich.

[21] Appl. No.: 75,549

[22] Filed: Jun. 14, 1993

[51] Int. Cl.$^5$ .............................................. B60R 21/13

[52] U.S. Cl. .................................. 280/304.1; 280/755

[58] Field of Search ..................... 280/304.1, 755, 293, 280/295, 298, 299, 300, 250.1, 47.16, 47.2; 297/DIG. 4

[56] References Cited

U.S. PATENT DOCUMENTS

| | | | |
|---|---|---|---|
| 1,492,487 | 4/1924 | Stokes | 280/755 |
| 2,629,611 | 2/1953 | Covington | 280/755 |
| 4,284,286 | 8/1981 | Lewallen | 280/47.2 |
| 4,522,320 | 6/1985 | Hannappel | 280/288.4 |
| 4,772,037 | 9/1988 | Jones | 280/293 |
| 4,886,294 | 12/1989 | Nahachewski | 280/755 |
| 5,071,150 | 12/1991 | Conrad | 280/264 |
| 5,121,806 | 6/1992 | Johnson | 180/65.5 |
| 5,181,733 | 1/1993 | Tague | 280/304 |
| 5,207,439 | 5/1993 | Mortenson | 280/47.2 |

FOREIGN PATENT DOCUMENTS

| | | | |
|---|---|---|---|
| 1260842 | 9/1989 | Canada | 280/755 |
| 3133636 | 3/1983 | Fed. Rep. of Germany | 280/304.1 |
| 9006097 | 6/1990 | World Int. Prop. O. | 280/304.1 |

*Primary Examiner*—Margaret A. Focarino
*Assistant Examiner*—Kevin Hurley
*Attorney, Agent, or Firm*—Learman & McCulloch

[57] ABSTRACT

A vehicle for physically disadvantaged persons and others desiring assistance which carries a chair at a relatively high level, is supported by wheels on front and rear axles. It has a rear bumper, supported by the frame and consisting of side attaching elements connected by a bumper cross element. Pivotally connected to each bumper side element is an anti-tip wheel support leg which mounts an anti-tip wheel having an axle connected to the lower end of each leg such that the legs are gravity biased to swing in toward the bumper. The wheel-supporting legs support the anti-tip wheels at a predetermined vertical distance above the ground when the frame is traveling over level ground, and are operative to automatically swing rearwardly away from the rear wheels to cause the anti-tip wheels to engage the ground and stabilize the vehicle from further tilting, when the frame tilts upwardly a predetermined amount from front to rear.

9 Claims, 2 Drawing Sheets

BUMPER MOUNTED ANTI-TIP STABILIZERS FOR CHAIR-MOUNTING VEHICLES UTILIZED BY PHYSICALLY DISADVANTAGED PERSONS AND OTHERS DESIRING MOBILITY ASSISTANCE, AND METHODS OF STABILIZING SUCH VEHICLES

BACKGROUND OF THE INVENTION

The present invention relates particularly to steerable, battery powered three or four wheeled vehicles of the type used by physically disadvantaged persons and others desiring to ride, and more specifically to new and useful improvements in such vehicles which stabilize them and resist their rearward over-turning when over-tilted upwardly from front to rear for any reason. Vehicles of this type have very significantly improved the quality of life for many people around the world by enhancing their freedom, independence, and mobility, however, it is well recognized that such vehicles must be extremely safe to operate under varied traveling conditions. Because vehicles of this character typically mount a vertically adjustable contour chair on an upstanding post at the rear end of the vehicle so that a relatively high center of gravity load is concentrated at the rear of the vehicle, there is a need to seek to prevent such vehicles from overturning and injuring the passenger, when an adverse tilt occurs.

DESCRIPTION OF THE PRIOR ART

Various anti-tip devices have been previously proposed for various vehicles and are exemplified in the following listed United States patents, which I incorporate herein by reference:

U.S. Pat. No. 4,522,420: Hannappel
U.S. Pat. No. 4,772,037: Jones
U.S. Pat. No. 4,886,294: Nahachewski
U.S. Pat. No. 5,071,150: Conrad
U.S. Pat. No. 5,121,806: Johnson
U.S. Pat. No. 5,181,733: Tague It will be clear from a review of these prior art patents that none, either singly or combinatively, anticipate the present invention and that there continues to be a need for the new and improved apparatus of the present invention which addresses the problems incident to providing anti-tip devices for the bumpers of such vehicles.

SUMMARY OF THE INVENTION

The present invention contemplates the provision of a rear bumper with vertically extending legs which attach to the vehicle, coupled with the pivotal attachment of anti-tip wheel supporting legs to the bumper side elements at each side of the machine. The leg and wheel assemblies are weighted in such a manner that the legs are gravity biased to swing in toward the bumper when the vehicle is traveling over level, or relatively level, ground. The legs are, further, of such length as to support the anti-tip wheels at a predetermined vertical distance above the ground engaging surface of the rear wheels when the frame is traveling over level ground. When the vehicle frame tilts upwardly from front to rear, however, as when the brakes are sharply applied as the vehicle is backing down a ramp, gravity swings the anti-tip legs and wheels rearwardly out away from the rear wheels to engage the ground at a spaced distance behind the rear wheels to stabilize the vehicle. Stop surfaces, reactive with the bumper, limit the rearward swing of the legs to permit the anti-tip wheels to function.

One of the prime objects of the present invention is to inhibit a rearward longitudinal overturn which could result in varying degrees of injury to the vehicle occupant, and even death, and to, further, avoid the vehicle damage which could be caused by the overturn.

Another object of the invention is to provide an anti-tip assembly operable automatically by gravity to swing from an inoperative storage position to an operative stabilizing position when the vehicle frame tilts rearwardly beyond a predetermined degree.

Still another object of the invention is to design a device of the character described which does not interfere with the operation of the vehicle on level terrain, or in negotiating curb or ramp surfaces.

A further object of the invention is to design anti-tip mechanism which secures readily to bumpers of the character indicated.

Another object of the invention is to design a relatively simple, yet effective, anti-tip mechanism which can be economically manufactured and marketed.

Still another object of the invention is to provide an anti-tip mechanism of non-complex nature, which is structurally sufficiently rugged for its purpose, and so is durable and trouble-free.

Other objects and advantages of the invention will become apparent with reference to the accompanying drawings and the accompanying descriptive matter.

GENERAL DESCRIPTION OF THE DRAWINGS

In the drawings, FIG. 1 is a side elevational view of a typical vehicle of the type mentioned, with the anti-tip wheel mechanism shown in the inoperative stored position, as when the vehicle is proceeding normally.

DETAILED DESCRIPTION OF THE DRAWINGS

Figure 1:
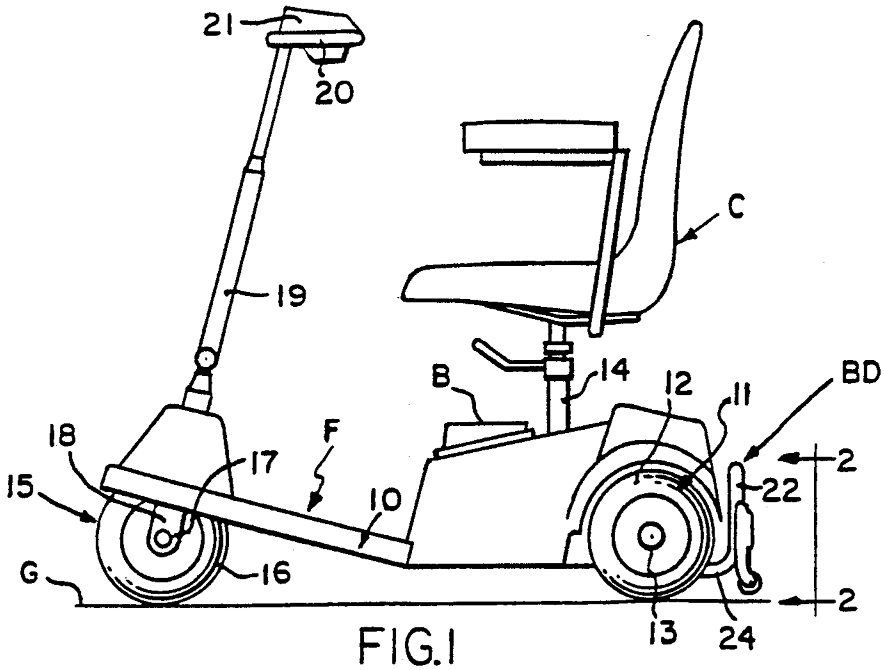

Referring now more particularly to the drawings, and in the first instance to FIG. 1 thereof, the motorized, preferably electrically powered, vehicle of the present invention comprises a lightweight, preferably aluminum, frame, generally designated F, which may include an extruded rail section generally designated 10, of U-shape when viewed in plan. Provided by the frame section 10, are side beams 10*a* which are spanned by a floor at their front ends and extend rearwardly. The vehicle, as usual, includes rear wheels 11, mounting tires 12 for engaging the ground surface G, which may be either the interior of a building or an outside surface. The wheels 11 may be powered by an electric motor (not shown) which revolves a rear axle assembly 13. As usual in vehicles of this type, batteries B are carried on the vehicle to drive the electric motor, and a contour chair C is adjustably mounted for swiveling and vertical movement on a chair post 14.

At its front end, the frame F is supported on a steerable wheel 15, having a ground engaging tire 16 which is journaled on a dead axle 17, carried by front wheel forks 18. The front wheel forks 18 connect to a steering post 19, which, at its upper end, incorporates the usual handlebars 20 and control console 21. As FIGS. 4 and 5 indicates the axle assembly 13 is carried by bearing members 13*a*, affixed by straps 13*b* to the rear end of frame rails 10*a*.

Also secured to the frame 10, beneath the axle assembly 13, is a rear bumper device, generally designated BD. The bumper device BD includes side elements 22, spanned by a cross-element 23, and having forwardly projecting members 24 which may be secured in position securely to the rear of frame 10 by fastener members 25.

Figure 2:
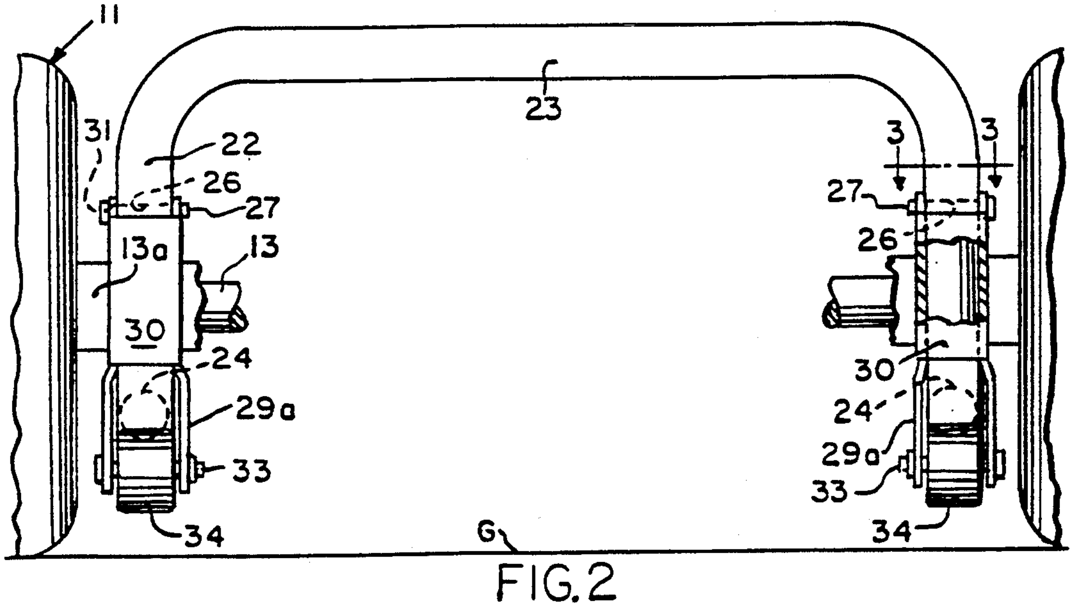
FIG. 2 is an enlarged, fragmentary end elevational view, taken on the line 2—2 of FIG. 1.
Figure 3:
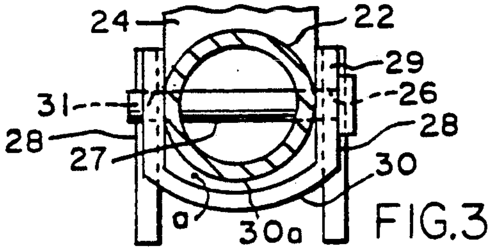
FIG. 3 is an enlarged, fragmentary sectional plan view taken on the line 3—3 of FIG. 2.

Provided at a predetermined location above ground level G on each of the bumper side elements 22 are side openings 26 for receiving pivot pins 27. Clevis shaped legs generally designated 28, and including side walls 29 and a rear wall 30, have openings 31 provided in the upper ends of the side walls 29 to freely pass the pivot pins 27. It is to be noted that back wall 30 is limited in length, and below it the side walls 29 flare outwardly, as shown in FIG. 2, and have rearwardly offset lower ends 29*a* with openings 32 rearwardly offset from the pins 27 provided therein. Pins 33, extending through the openings 32, mount wheels 34 in predetermined position at a spaced distance upwardly from ground level G and the ground contact of tires 16 with the ground G. As shown in FIG. 3, there is a sufficient clearance "*a*" between the upper edge 30*a* of each back wall 30 and the bumper side element 22 to permit the members 28 to swing rearwardly to the position shown in FIG. 5. The angle z, which is possible, is 28°, which has been predetermined to be an ideal angle when the wheels 34, in the FIG. 4 position, are located approximately an inch off ground level G.

THE OPERATION

Figure 4:
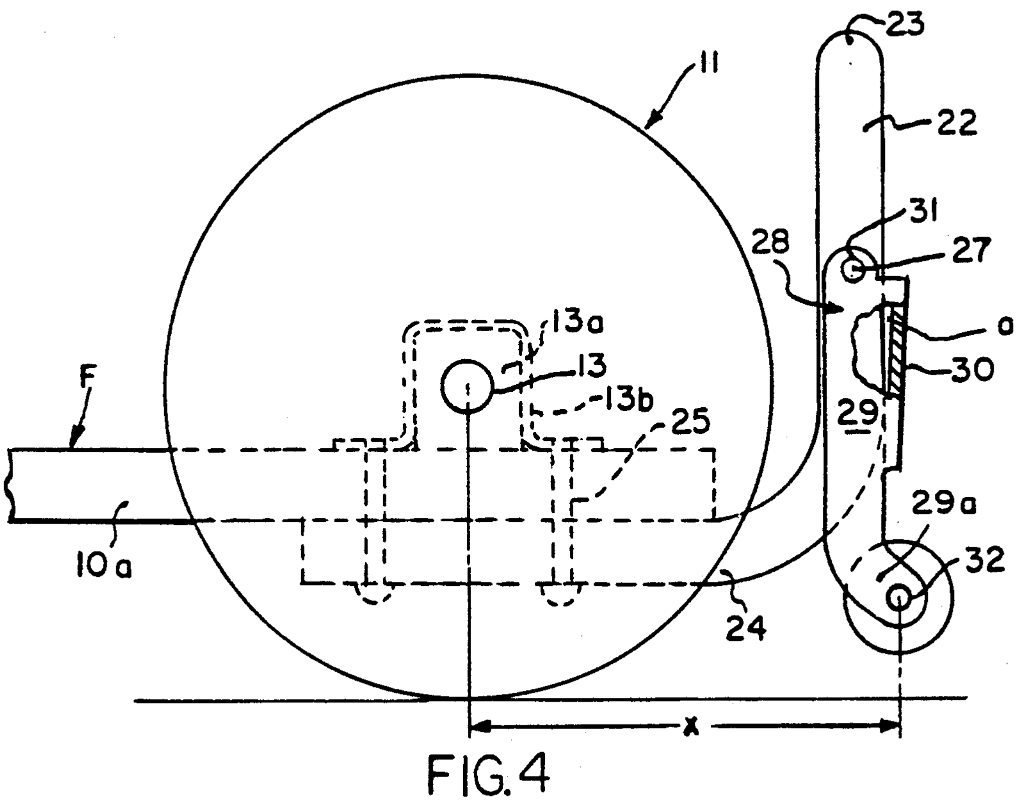
FIG. 4 is an enlarged, schematic, fragmentary, side elevational view showing the anti-tip mechanism in operative stored position, many elements of the vehicle having been omitted in the interest of clarity.
Figure 5:
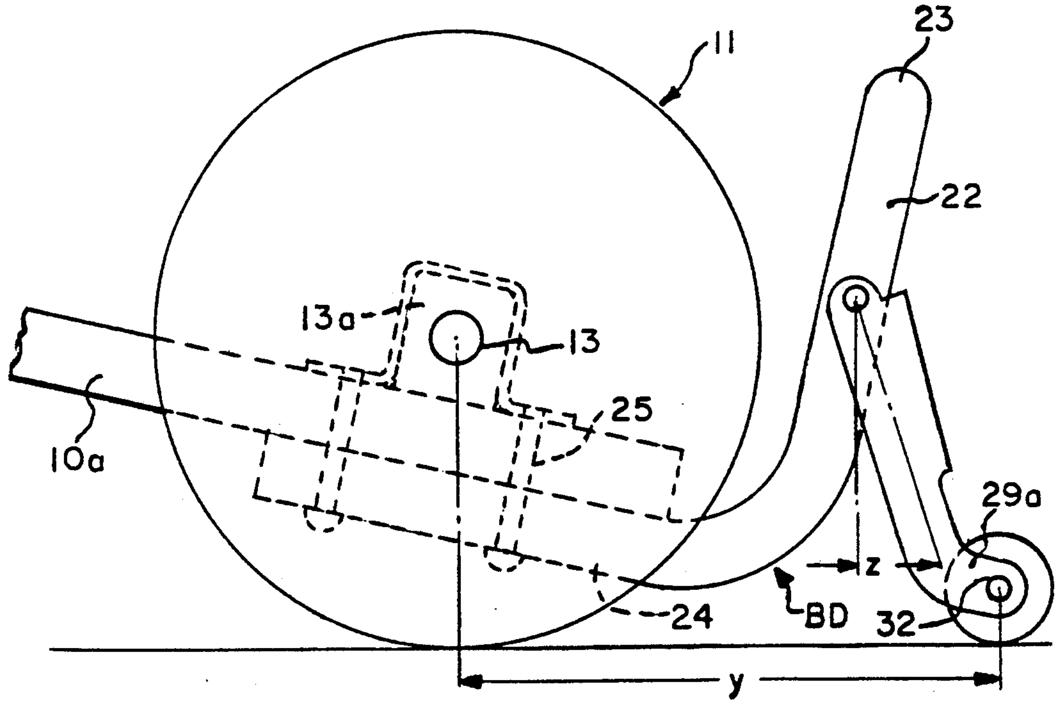
FIG. 5 is a similar schematic view with the vehicle shown in a front to rear tipped position in which the stabilizing anti-tip wheels have been gravity-motivated to assume an operative stabilized position.

As FIG. 4 clearly indicates, in normal position there is a distance x between the axis of the axle assembly 13 and the axis of anti-tip wheel supporting pin 32. When tipping of the frame 10 occurs, however, as shown in FIG. 5, gravity which has previously maintained the housings 28 in the vertical position shown in FIG. 4 in which they substantially align with the bumper side elements 22, swings the elements 28 and wheels 34 outwardly to increase the distance between these axes to the distance y. This swinging movement is halted, and the legs 28 are braced by the bumper, when the leg edges 30*a* engage their respective bumper elements or posts 22. With this engagement at the rear of the vehicle, on both sides of the vehicle, the vehicle is much stabilized and resists the tendency of the vehicle to tilt further and overturn.

It is to be understood that the embodiments described are exemplary of various forms of the invention only and that the invention is defined in the appended claims which contemplate various modifications within the spirit and scope of the invention.

What is claimed is:

1. A vehicle, having a frame with a chair thereon, and carried on a pair of rear wheels having ground engaging surfaces, said pair or rear wheels being mounted on an axle assembly and at least one front wheel having a ground engaging surface, including:

(a) a rear bumper supported by said frame and including side elements at each side of the vehicle frame;

(b) an anti-tip wheel support leg pivotally connected to each side element for front to rear swinging movement;

(c) pivot means for said legs;

(d) an anti-tip wheel connected to the lower end of each leg such that said legs are gravity biased to swing forwardly in toward said bumper;

(e) said legs being of a length to support said anti-tip wheels at a predetermined vertical distance above the ground engaging surface of the rear wheels when the frame is traveling over level ground, and operative to swing rearwardly out away from said rear wheels, when the vehicle frame tilts upwardly from front to rear, to engage the ground; and (f) means for limiting the rearward swing of said legs to permit said anti-tip wheels to stabilize the vehicle and resist further tilting movement.

2. The vehicle of claim 1 wherein said bumper side elements comprise vertically extending arms and forwardly extending projections extending forwardly therefrom to connect to said frame between said rear wheels below said axle assembly.

3. The vehicle of claim 2 wherein said legs carry stop surfaces thereon for engaging said bumper side elements and limiting the inward travel of said legs to a generally vertical position substantially co-extending with said arms.

4. The vehicle of claim 1 wherein said legs have stop surfaces which engage said bumper and limit the rearward pivoting movement of said legs to permit the legs to resist overturning.

5. The vehicle of claim 1 wherein said anti-tip wheels are sufficiently rearwardly offset from said pivot means to weight said legs to swing forwardly when the frame is relatively level.

6. The vehicle of claim 1 wherein said pivot means is spaced a predetermined distance above said axle assembly.

7. A method of securing anti-tip wheels to a vehicle for physically disadvantaged persons and others desiring assistance, and having a frame, with a chair thereon, carried on a pair of rear wheels having ground engaging surfaces and at least one front wheel, and further including a rear bumper supported by said frame and comprising side elements for attaching said bumper to said frame, the steps of:

(a) pivotally connecting legs, on which said anti-tip wheels are journaled, to said bumper side elements at locations to leave said anti-tip wheels a spaced distance vertically above the ground engaging surfaces of the rear wheels, and with the legs gravity biased to swing forwardly in toward said bumper side elements when the vehicle frame is in substantially level position;

(b) providing means limiting the forward movement of said legs to a substantially vertical position such that, when said frame tilts appreciably upwardly from front to rear, said legs swing rearwardly out away from said rear wheels to engage a ground surface; and (c) providing means limiting the rearward movement of said legs to stabilize the vehicle.

8. The method of claim 7 wherein the means limiting the front and rear movement of said legs is provided by locating stop surfaces on said legs.

9. A method of stabilizing a vehicle from tipping having a frame with a chair thereon carried on a pair of rear wheels and having ground engaging surfaces and at least one front wheel, and including a rear bumper supported by said frame and comprising laterally spaced apart side elements connected to said frame by a bumper cross-element, an anti-tip wheel support leg pivotally connected to each side element, pivot means for pivotally connecting said legs to said bumper side elements, an anti-tip wheel having an axle connected to the lower end of each leg such that said legs are gravity biased to swing forwardly in toward said bumper, said legs being of a length to support said anti-tip wheels at a predetermined vertical distance above the ground engaging surfaces of the rear wheels when the vehicle is on relatively level ground and operative to swing rearwardly away from said rear wheels when the vehicle frame tilts upwardly from front to rear to engage the ground, comprising the steps of:

(a) gravity separating said anti-tip wheels from said rear wheels by causing the legs to swing rearwardly, when the vehicle tips, to a position wherein the wheels engage the ground; and (b) limiting the spread of the anti-tip wheels from the rear wheels, after the wheels have traveled a predetermined distance rearwardly, to permit the legs to stabilize the vehicle.

* * * * *